May 23, 1944. C. H. NAPIER 2,349,295
HYDRAULIC CONTROL MECHANISM
Filed April 10, 1943 2 Sheets-Sheet 1

INVENTOR
CHARLES H. NAPIER
BY
ATTORNEY

May 23, 1944.  C. H. NAPIER  2,349,295
HYDRAULIC CONTROL MECHANISM
Filed April 10, 1943  2 Sheets-Sheet 2
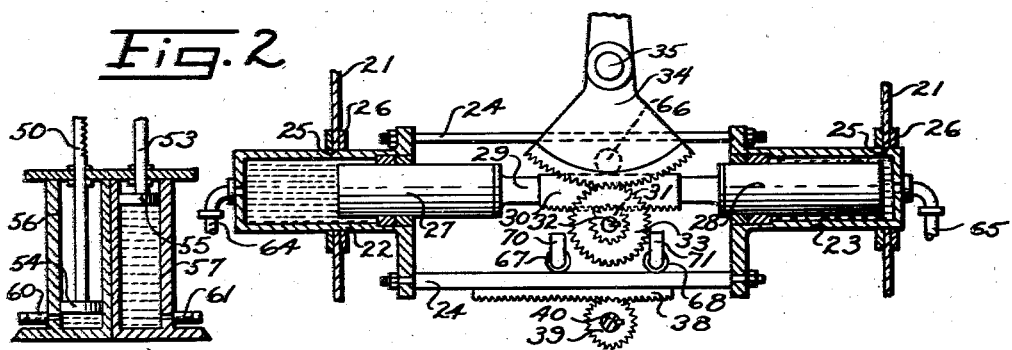
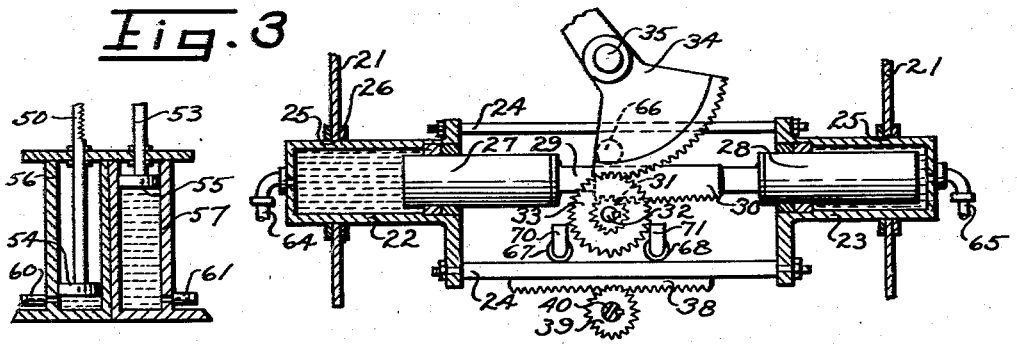
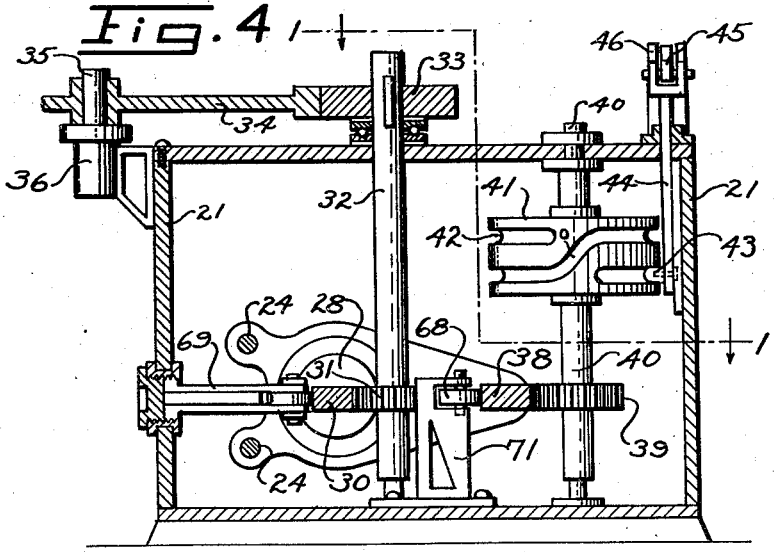
INVENTOR
BY CHARLES H. NAPIER
ATTORNEY Patented May 23, 1944

2,349,295

UNITED STATES PATENT OFFICE 2,349,295

HYDRAULIC CONTROL MECHANISM

Charles H. Napier, Bethesda, Md.

Application April 10, 1943, Serial No. 482,881

4 Claims. (Cl. 60—52)

(Granted under the act of March 3, 1883, as amended April 30, 1928; 370 O. G. 757)

This invention relates to an improved apparatus for controlling the operation of hydraulically actuated devices such as ship's steering gear, gun turrets, etc.

In hydraulically actuated steering gear, for example, of the type with which the present invention is concerned, it is present practice to provide an electric motor driven, variable displacement pump which is connected to a double acting fluid motor, the piston rod of the latter being mechanically coupled to the ship rudder.

The amount and direction of fluid flow between the pump and motor is under control of a "follow-up" mechanism whereby the displacement of the pump is varied in accordance with the relative positions of the ship's steering wheel and the rudder. So long as the rudder position corresponds to the position of the steering wheel, the displacement of the pump is maintained at zero. However, when the position of the steering wheel is changed to initiate a change in course of the ship, the displacement of the pump is such as to bring the rudder to a new position which corresponds to the changed position of the steering wheel. Present known "follow-up" mechanism comprises a gear differential receiving movement from both the steering wheel and ship rudder, the output of the differential being connected to a lever or other actuating device on the pump for controlling the displacement of the latter.

It is the principal object of this invention to provide an improved control apparatus of the general type described which uses fluid telemotors arranged to act differentially as the "follow-up" mechanism in lieu of the gear differential now utilized in the art for this purpose.

This and other objects of my invention will become more apparent from the following description when considered with the accompanying drawings which illustrate a preferred embodiment of the invention as applied to ship steering control.

In the drawings in which like parts in the various views are designated by like reference characters, Fig. 1 is essentially a plan view of the steering mechanism, part of which is shown in section taken on lines 1—1 of Fig. 4.

Fig. 2 is also a plan view of the telemotor apparatus showing the rudder stock at a center position and the telemotors at a position corresponding to a selected change in position of the rudder from its center position to an extreme right position;

Fig. 3 is likewise a plan view of the telemotor apparatus showing the positions of the parts and the rudder after the "follow-up" mechanism has operated to move the rudder from a center position to its new extreme right position; and Fig. 4 is an elevation, partly in section, of a portion of the apparatus.

Figure 1:
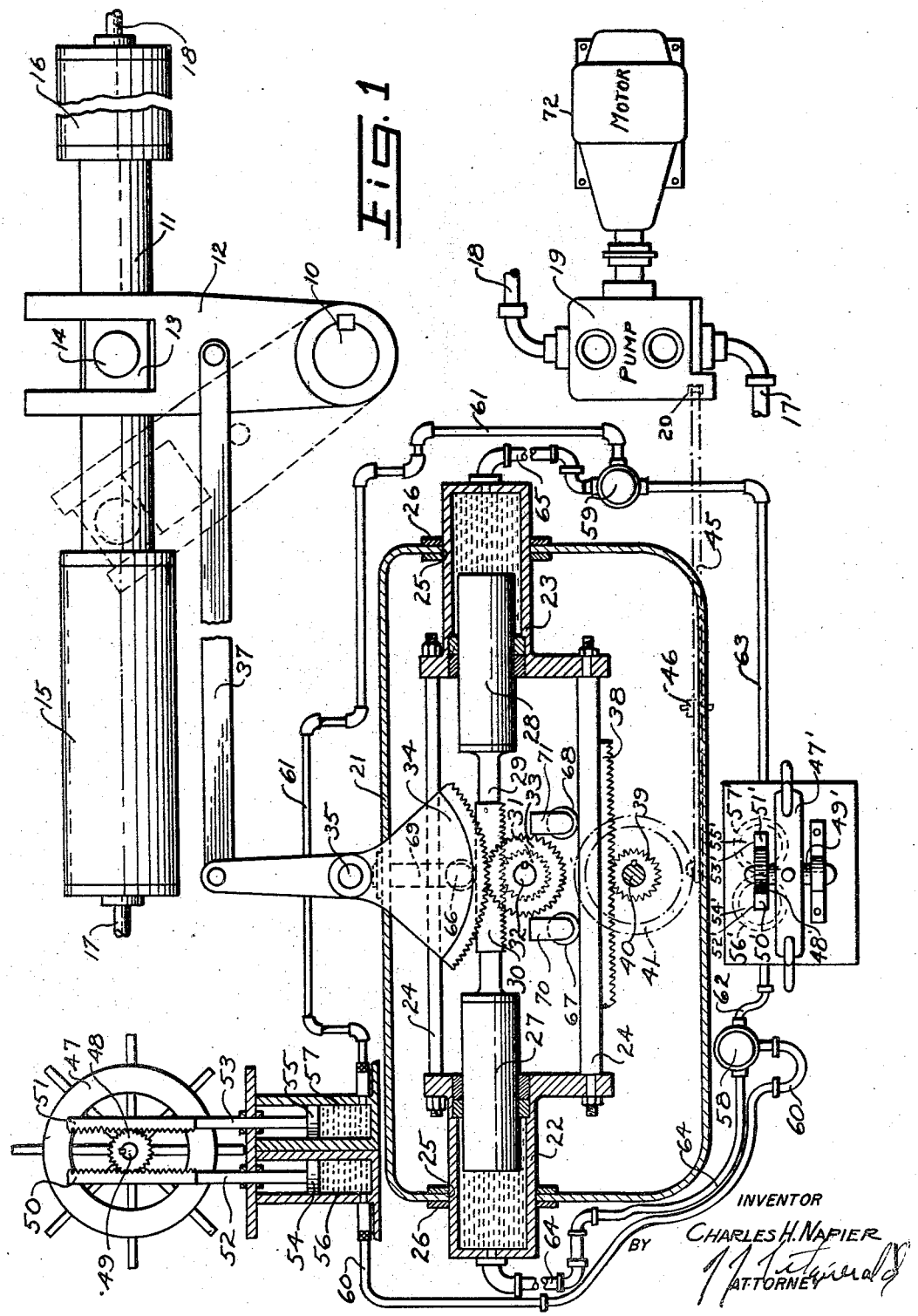

Referring now in particular to Figs. 1 and 4, a rudder stock 10 is shown connected to a ram 11 by a yoke 12, the latter being provided with a slide 13 connected to a pin 14 upstanding from the ram 11. The ends of the ram 11 are received in a pair of hydraulic cylinders 15 and 16, the latter being connected by pipes 17 and 18 to a variable displacement pump 19 which may be electrically driven by motor 72.

Pump 19, which supplies fluid to the cylinders 15 and 16 to operate the ram 11 may be of any suitable type. I prefer, however, to utilize the well known Waterbury variable stroke type in which fluid flow through the pump is controlled by a "tilting plate," the latter being operable from a neutral position in one direction or the other as the case may be to place the pump "on stroke." Movement of the "tilting plate" in one direction from neutral causes fluid to flow in one direction through the pump while movement in the other direction causes fluid to flow through the pump in an opposite direction.

Details of the construction of the pump 19 have not been shown since they are well known and do not per se constitute a part of my invention, one such type of pump being shown and described in U. S. Patent No. 1,794,946.

Suffice to say, however, for purposes of illustrating my invention, the tilting plate (not shown) in pump 19 is actuated by a rod 20 movable reciprocally and extending vertically outward from the pump housing.

The differentially acting telemotor apparatus and part of the associated gearing is contained within a housing 21. Telemotor cylinders 22 and 23 are fixed in spaced relation to each other by means of a plurality of rods 24. As will be explained hereinafter, cylinders 22 and 23 in performing their function must be reciprocally movable and such movement is provided by journalling the cylinders in openings 25 provided in each end wall of the housing 21. Packing gland 26 is provided to make a fluid tight seal between the cylinders 22, 23 and the openings 25, it being intended that the housing 21 will be filled with oil to lubricate the gearing therein.

Telemotor rams 27 and 28 are connected to operate as a unit within the cylinders 22 and 23 by means of a shaft 29 which includes a rack gear 30. Gear 30 is meshed with a pinion gear 31 keyed to a shaft 32 which extends vertically through the top wall of housing 21.

A second pinion gear 33 is keyed to shaft 32 adjacent the top thereof and meshes with a segment gear 34 which is suitably journalled for rotation by means of a stub shaft 35 and bearing 36 carried by housing 21. The end of segment gear 34 opposite the toothed portion thereof is pivotally connected to one end of a tie rod 37, the opposite end of the latter being pivotally connected to yoke 12.

On one of the rods 24, a second rack gear 38 is carried. Gear 38 meshes with pinion gear 39, the latter being keyed to a vertically extending shaft 40. Also keyed to shaft 40 is a cylindrical member 41 which is provided with a continuous grooved portion 42. As clearly shown in Fig. 4, a follower 43 rides in the groove 42 and follower 43 is directly connected to one end of a vertically extending rod 44.

A lever 45 pivoted at a medial point thereof by a pivot assembly 46 on housing 21 is provided. Rod 44 is pivotally connected to one end of lever 45 and the rod 20 (which controls the tilting plate in pump 19) is pivotally connected to the other end of lever 45. The arrangement of parts is such that when follower 43 occupies a middle portion o in the groove 42, the rod 20 remains in a center position to thereby maintain the tilting plate of pump 19 in a neutral or "off-stroke" position. Rotation however of the cylinder 41 in one direction will cause follower 43 and hence rod 44 to move upwardly resulting in downward motion of rod 20 from its neutral position, and hence placing pump 19 "on-stroke" to pump fluid therefrom in one direction. Conversely, rotation of cylinder 41 in an opposite direction effects in a similar manner a motion of rod 20 upwardly from its neutral position, hence placing pump 19 "on-stroke" to pump fluid therefrom in an opposite direction.

For controlling fluid flow to the telemotor cylinders 22 and 23, a pair of telemotor assemblies are provided and are operated respectively by movement of the steering wheels 47 or 47'. Wheel 47, for example, may be located on the bridge of the ship while wheel 47' commonly referred to as the "trick wheel," might be located in the aft portion of the ship where the rudder actuating ram 11 is located.

Pinion gears 48, 48' keyed to shafts 49, 49' as are also the wheels 47 and 47' are adapted to mesh with pairs of rack gears 50, 50' and 51, 51'. The latter rack gears are connected respectively to piston rods 52, 52' and 53, 53' which are connected to pistons 54, 54' and 55, 55'. The latter pistons operate respectively in telemotor cylinders 56, 56' and 57, 57'.

In order that either the wheel 47 or 47' may be selected to operate the rudder stock 10, a pair of two way valves 58 and 59 are provided in the conduit system connecting the cylinders 22 and 23 with either pair of cylinders 56, 57 and 56', 57'. The pipe lines in the conduit system comprise pipe 60 between cylinder 56 and valve 58, pipe 61 between cylinder 57 and valve 58, pipe 62 between cylinder 56' and valve 59, pipe 63 between cylinder 57' and valve 59 and pipes 64 and 65 between the valves 58, 59 and cylinders 22, 23.

For guiding the rods 24, a plurality of rollers 66, 67 and 68 suitably journalled in support pedestals 69, 70 and 71 may be utilized if desired.

Operation

My device operates in the following manner: Let it be assumed, for example, that the rudder stock 10, ram 11 and yoke 12 are initially in the positions shown in full lines in Fig. 1, in which positions the rudder (not shown) is in a center position. In the event it is now desired to move the rudder from its center position to change course, the pilot will turn the wheel 47 an amount equal to the desired new position of the rudder. Referring to Fig. 2, this causes piston 54 to move downwardly and piston 55 to move upwardly to the positions shown. As piston 54 moves downwardly, fluid will be ported from telemotor cylinder 56 through pipe 60, valve 58 and pipe 64 to telemotor cylinder 22. Since the segment gear 34 is fixed by tie rod 37 to yoke 12 and hence cannot move, pinion gear 33, shaft 32, pinion gear 31, rack 30, shaft 29 and pistons 27, 28 are also incapable of movement at this time. Thus as fluid is ported to cylinder 22, the latter as well as cylinder 23 will be moved to the left to the position shown in Fig. 2. The fluid initially in cylinder 23 and forced therefrom as it moves to the left is ported through pipe 65, valve 59 and pipe 61 to the interior of cylinder 57, the volume of the latter being increased by upward movement of piston 55.

Since movement of cylinders 22 and 23 to the left also carries rack gear 38 to the left, pinion gear 39 will be rotated counter-clockwise to effect equal rotation of shaft 40 and the grooved cylinder 41. As the latter rotates, the follower 43 moves from the position o downwardly to the position shown in Fig. 4.

As previously explained, this causes downward motion of rod 44, rocking lever 45 about its pivot and effecting upward movement of pump rod 20. As rod 20 moves upward, the tilting plate in pump 19 is moved from a neutral position to place the pump "on stroke."

As pump 19 goes "on stroke," fluid will be ported therefrom through pipe 18 into the main ram cylinder 16 to thus start movement of the ram 11 and yoke 12 to the position shown in the broken lines in Fig. 1, which turns the rudder stock 10.

Now as yoke 12 moves to the left, shaft 37 also moves to the left effecting counter-clockwise rotation of segment gear 34 until it reaches the position shown in Fig. 3. Rotation of gear 34 effects clockwise rotation of pinion gear 33, shaft 32 and pinion gear 31. Since gear 31 meshes with rack gear 30, the latter will move to the right carrying with it the telemotor rams 27 and 28 as well as telemotor cylinders 22, 23 and rack gear 38. As rack gear 38 moves to the right, pinion gear 39 meshed with it, shaft 40 and grooved cylinder 41 all rotate clockwise until the follower 43 again moves from the lower groove to the neutral position o. Upon reaching this position, rod 44 is again in the position where the tilting plate of pump 19 is restored to neutral and the pump goes to an "off-stroke" position.

A similar but reversed operation of parts will take place in the event that a change in course in an opposite direction is desired.

In conclusion, I wish it to be understood that while the present embodiment of the invention is a preferred one, modifications therein may occur to those skilled in the art without departing from the spirit and scope of my invention as defined by the appended claims.

The invention described herein may be manufactured and used by or for the Government of the United States of America for governmental purposes without the payment of any royalties thereon or therefor.

Having thus fully described my invention, I claim.

1. The combination with a ship's rudder, of actuating means for said rudder, control means for said actuating means, a double acting fluid operated telemotor comprising a pair of pistons connected together for operation as a unit, a pair of cylinders for said pistons, means connecting said cylinders together, bearing means for supporting said cylinders to permit the latter to move as a unit relative to said pistons, means connecting said rudder with said pistons so that only movement of said rudder will effect movement of said pistons, means connecting said movable cylinders to said control means for operation of the latter, and means for admitting fluid under pressure from a steering position to either one of said cylinders to effect movement thereof and of said control means in one direction to initiate operation of said rudder actuating means, movement of said rudder then being effective to move said pistons and cylinders as a unit in an opposite direction to restore said control means to its initial position and stop operation of said rudder actuating means.

2. The combination with a ship's rudder, of actuating means for said rudder, control means for said actuating means, a double acting fluid operated telemotor comprising a pair of pistons, means for connecting said pistons together for operation as a unit, a first rack gear carried by said connecting means, a pair of cylinders for said pistons, means for connecting said cylinders together, a second rack gear carried by said cylinder connecting means, bearing means for supporting said cylinders to permit the latter to move as a unit relative to said pistons, gearing means including a pinion gear meshed with said first rack gear for connecting said rudder with said pistons so that only movement of said rudder can effect movement of said pistons, gearing means including a second pinion gear meshed with said second rack gear for connecting said cylinders to said control means for operation of the latter, and means for admitting fluid under pressure from a steering position to either one of said cylinders to effect movement thereof and of said control means in one direction to initiate operation of said rudder actuating means, movement of said rudder then being effective to move said pistons and cylinders as a unit in an opposite direction to restore said control means to its initial position and stop operation of said rudder actuating means.

3. The combination with a ship's rudder, of fluid motor means for actuating said rudder, fluid pump means for operating said fluid motor means, control means operable to start and stop said pump means, a double acting fluid operated telemotor comprising a pair of pistons, means for connecting said pistons together for operation as a unit, a first rack gear carried by said connecting means, a pair of cylinders for said pistons, means for connecting said cylinders together, a second rack gear carried by said cylinder connecting means, bearing means for supporting said cylinders to permit the latter to move as a unit relative to said pistons, gearing means including a pinion gear meshed with said first rack gear for connecting said rudder to said pistons so that only movement of said rudder can effect movement of said pistons, gearing means including a second pinion gear meshed with said second rack gear for connecting said cylinders to said pump control means for controlling operation of the latter, and means for admitting fluid under pressure from a steering position to either one of said cylinders to effect movement thereof and of said control means in one direction to start said pump means whereby said rudder will be moved, movement of said rudder then being effective to move said pistons and cylinders as a unit in an opposite direction to restore said pump control means to its initial position and stop said pump means thereby stopping said fluid motor means and hence said rudder.

4. The combination with a device, of actuating means for said device, control means for said actuating means, a double acting fluid operated telemotor comprising a pair of pistons connected together for operation as a unit, a pair of cylinders for said pistons, means connecting said cylinders together, bearing means for supporting said cylinders to permit the latter to move as a unit relative to said pistons, means connecting said device with said pistons so that only movement of said device will effect movement of said pistons, means connecting said movable cylinders to said control means for operation of the latter, and means for admitting fluid under pressure from a control position to either one of said cylinders to effect movement thereof and of said control means in one direction to initiate operation of said device actuating means, movement of said device then being effective to move said pistons and cylinders as a unit in an opposite direction to restore said control means to its initial position and stop operation of said actuating means for said device.

CHARLES H. NAPIER.